(12) United States Patent
Mainville et al.

(10) Patent No.: US 6,447,055 B1
(45) Date of Patent: Sep. 10, 2002

(54) COMBINATION GRAB HANDLE AND GARMENT HOOK

(75) Inventors: Marc Mainville, Windsor (CA); Ben Delphia, White Lake, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/687,413

(22) Filed: Oct. 13, 2000

Related U.S. Application Data

(60) Provisional application No. 60/159,143, filed on Oct. 13, 1999.

(51) Int. Cl.[7] .............................................. B60R 13/02
(52) U.S. Cl. ...................... 296/214; 296/37.7; 224/313; 224/927
(58) Field of Search ............................... 296/214, 39.1, 296/37.7; 224/311, 313, 315, 927

(56) References Cited

U.S. PATENT DOCUMENTS

| | | |
|---|---|---|
| 2,141,659 A | 12/1938 | Nehls |
| 3,424,418 A | 1/1969 | Freedman et al. |
| 4,067,602 A | 1/1978 | Ahlisch et al. |
| 4,221,354 A | 9/1980 | Kempers |
| 4,492,260 A | 1/1985 | Whiteford |
| 4,720,028 A | 1/1988 | Takemura et al. |
| 4,981,322 A | 1/1991 | Dowd et al. |
| 4,981,323 A * | 1/1991 | Dowd et al. ................. 296/214 |
| 5,210,905 A | 5/1993 | Dietz et al. |
| 5,328,068 A | 7/1994 | Shannon |
| 5,366,127 A | 11/1994 | Heinz |
| 5,419,067 A * | 5/1995 | Drummond et al. .. 224/42.45 A |
| 5,440,783 A | 8/1995 | Allardyce et al. |
| 5,625,921 A * | 5/1997 | Smith ........................... 16/112 |
| 5,632,061 A | 5/1997 | Smith et al. |
| 5,820,205 A | 10/1998 | Ammons |
| 5,855,408 A | 1/1999 | Rickabus |
| 5,894,968 A * | 4/1999 | Christensen ............ 224/313 X |
| 5,954,252 A | 9/1999 | Gebreselassie et al. |
| 5,975,606 A * | 11/1999 | Forbes et al. ........... 296/214 X |
| 5,991,976 A | 11/1999 | Adams et al. |
| 6,076,233 A * | 6/2000 | Sasaki et al. .................. 16/444 |
| 6,076,716 A * | 6/2000 | Reyes ......................... 224/482 |
| 6,095,469 A * | 8/2000 | Von Alman ............ 224/313 X |
| 6,220,645 B1 * | 4/2001 | Jacquemin .............. 296/214 X |

* cited by examiner

Primary Examiner—Stephen T. Gordon
Assistant Examiner—Lori L Coletta
(74) Attorney, Agent, or Firm—Clark Hill PLC

(57) ABSTRACT

A combination grab handle and garment hook assembly comprises a base slidably coupled to an interior trim panel of a vehicle and an elongated handle. A pivot mechanism pivotally couples the handle to the base for providing rotational movement of the handle relative to the base along a plane generally parallel to the base between a stowed position and a deployed position projecting into the interior of the vehicle. In the stowed position, the handle may be used as a grab handle to support a passenger within the vehicle and in the deployed position, the handle may be used as a garment hook for supporting a larger capacity of garments inwardly of the interior trim panel. The assembly further includes a locking mechanism for locking the handle in each of the stowed and deployed positions. Still further, the assembly includes a track system for sliding the base along trim panel and providing a variety of positions of the assembly within the interior of the vehicle.

16 Claims, 3 Drawing Sheets

COMBINATION GRAB HANDLE AND GARMENT HOOK

RELATED APPLICATION

This application claims the benefit under 35 USC 119(e) of U.S. provisional application No. 60/159,143, filed on Oct. 13, 1999.

BACKGROUND OF THE INVENTION

1. Field of the Invention

The subject invention relates to a combination grab handle and garment hook for use in an automotive vehicle.

2. Description of the Related Art

Automotive vehicles often include garment hooks attached to the interior trim panel of the vehicle adjacent the ceiling and rear door or side window of the vehicle, as exemplified in U.S. Pat. No. 5,954,252, for supporting and transporting garments on garment hangers within the vehicle. These types of garment hooks are often small and not capable of handling or supporting a large number of garments. Because the small hooks are incapable of holding a large number of garments, they are usually not adequately functional for use when traveling, picking up garments from a dry cleaner, and other times when large hanging capacity is desired.

Many vehicles also often have assist, or grab handles, attached to the interior trim panel of the vehicle and located near the ceiling, typically above the rear door or side windows of the vehicle, such as exemplified in U.S. Pat. No. 5,855,408, for providing support to passengers within the vehicle and to assist in the ingress and egress within the vehicle. Vehicle passengers also often use these grab handles to overcome the limited handling capacity of garment hooks by hanging their garments, and garment hangers, directly over and through the grab handles. Due to the design of these grab handles, it is often difficult to pass a hook of the garment hanger through an opening between the grab handle and the interior trim panel or ceiling to which the grab handle is attached. In some cases, the garment hangers will tear, damage, or scrape the ceiling or grab handle as the passenger forces the garment hanger through the opening and onto the handle. Due to the position of the grab handles, garments that are hung on the grab handle also tend to bunch against the door or window causing wrinkling and possibly soiling the garments.

It is also known to provide accessory devices for supporting garments and garment hangers which can be attached to the existing garment hooks or grab handles within the vehicle. An example of such an accessory device is shown in U.S. Pat. No. 5,328,068. However, these devices can be expensive and cumbersome to employ. Theses type of accessory device may also defeat the purpose and function of the existing garment hook and/or grab handle. Therefore, these devices may not remedy the problems associated with using the grab handles or the small garment hooks.

Thus, it is desirable a provide an improved garment hook capable of supporting a larger capacity of garments and a functional grab handle for assisting a passenger within the vehicle.

SUMMARY OF THE INVENTION

The subject invention relates to a combination grab handle and garment hook assembly comprising a base adapted to be mounted to an interior trim panel of a vehicle and an elongated handle. A pivot mechanism pivotally couples the handle to the base for providing rotational movement of the handle relative to the base along a plane generally parallel to the base between a stowed position and a deployed position projecting into the interior of the vehicle. In the stowed position, the handle may be used as a grab handle to support a passenger within the vehicle and in the deployed position, the handle may be used as a garment hook for supporting a larger capacity of garments inwardly of the interior trim panel. The assembly further includes a locking mechanism for locking the handle in each of the stowed and deployed positions. Still further, the assembly includes a track system for providing a variety of positions of the assembly along the trim panel within the interior of the vehicle.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
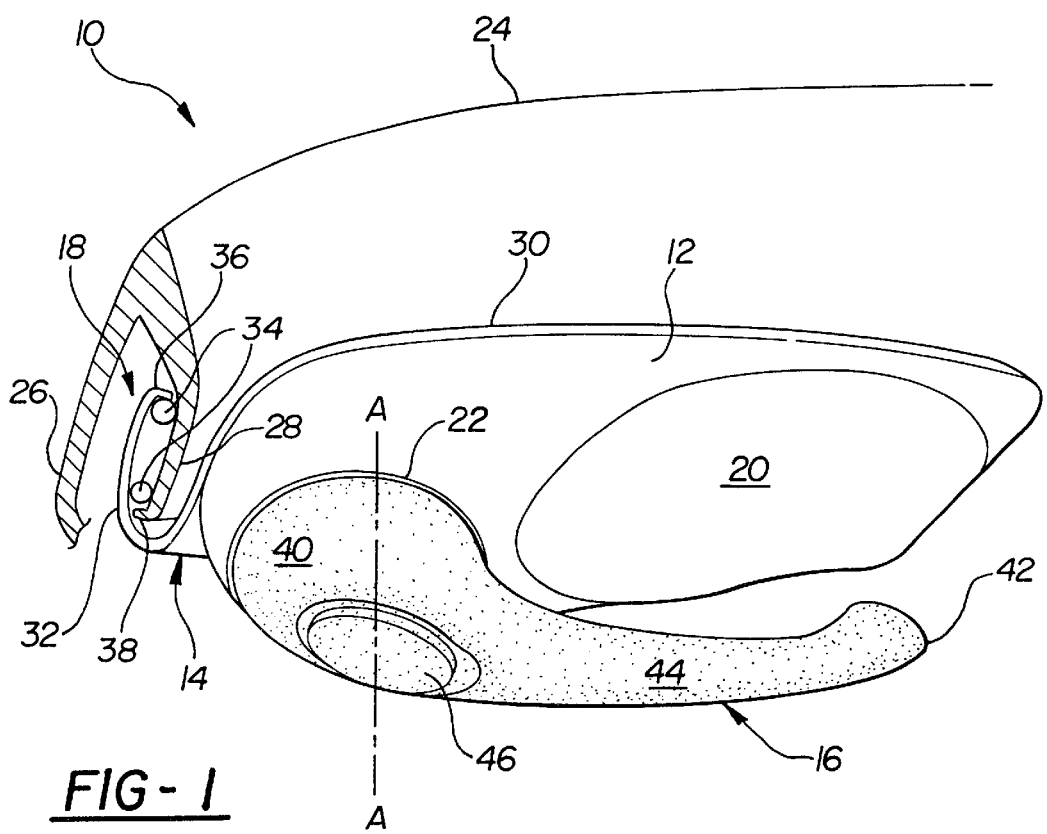
FIG. 1 is a partially broken perspective view of the combination grab handle and garment hook assembly in a handle support position.

Referring to the drawings, wherein like numerals indicate like or corresponding parts throughout the several views, a combination grab handle and garment hook assembly is generally shown at 10 in FIG. 1. The assembly 10 comprises a base 12, an anchor 14, a handle 16, and a hidden track system 18. The base 12 is a generally rectangular member having a recessed, or concave, top surface 20 and an opening 22 extending therethrough. The base 20 is fixedly attached to the anchor 12. The anchor 14 is slidably coupled by the hidden track system 18 to an elongated interior trim panel 24 secured within an automotive vehicle as is commonly known in the art. More specifically, the trim panel 24 includes a planar rear wall 26 fixedly secured to the interior of the vehicle and a planar front wall 28 spaced parallel to the rear wall 26. The anchor 14 includes a first planar panel 30 supporting the base 12 and a J-shaped hook portion 32 extending from the panel 30.

The hidden track system 18 comprises the sliding coupling arrangement between the front wall 28 and the J-shaped hook portion 32. Specifically, the J-shaped hook portion 32 extends between the front wall 28 and the rear wall 26 of the trim panel 24, as shown in FIG. 1. A plurality of spherical ball bearings 34 are positioned between the J-shaped hook portion 32 and the front wall 28 to provide rolling and sliding movement therebetween. The distal ends of the J-shaped hook portion 32 and front wall 28 have bent portions 36, 38 to capture the ball bearings 34 therebetween and interlock the hook portion 32 and front wall 28. The hidden track system 18 allows the anchor 14 to slide on the ball bearings 34 allowing the assembly 10 to travel longitudinally along the trim panel 24 for positioning the assembly 10 in various locations within the interior of the vehicle.

Figure 3:
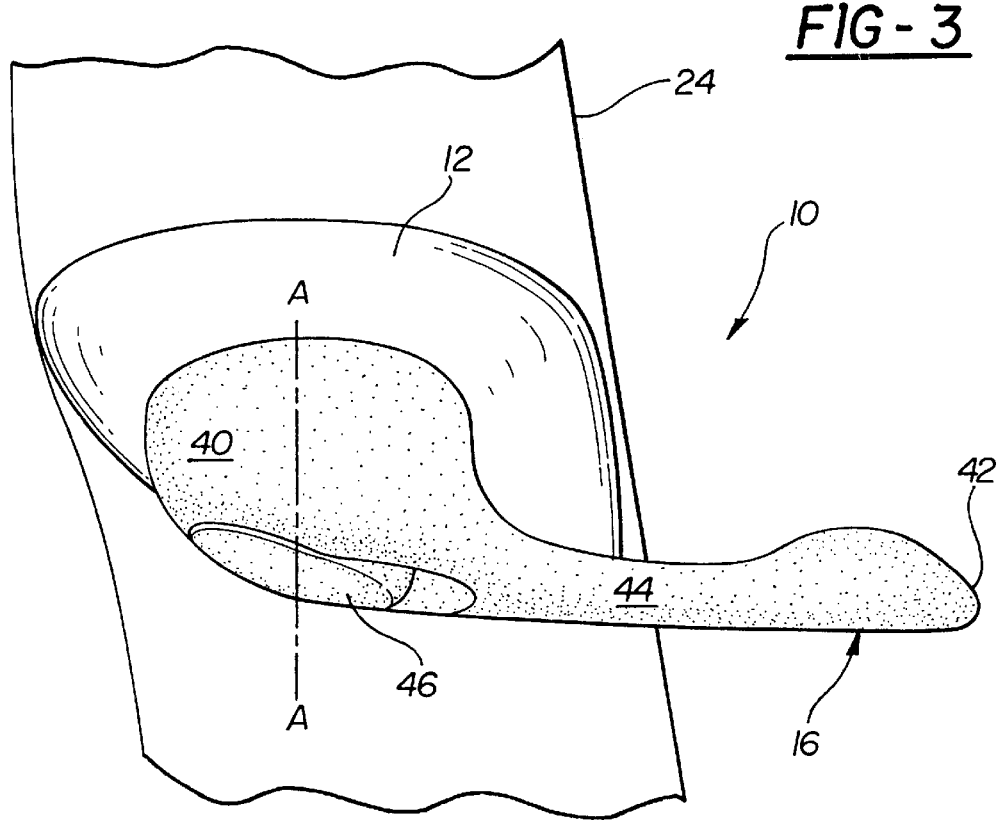
FIG. 3 is a perspective view of the combination grab handle and garment hook in the fully deployed position.

The handle 16 includes a mounting portion 40, a longitudinally extending distal end 42, and a grab portion 44 extending between the mounting portion 40 and the distal end 42. The distal end 42 forms a bulbous portion. The grab portion 44 is spaced from and generally parallel to the top surface 20 of the base 12 defining an open space therebetween. The handle 16 is pivotally coupled to the base 12 by a pivot post 46. The pivot post 46 defines a pivot axis A—A which is generally perpendicular to the plane of the top surface 20 and trim panel 24 and allows the handle 16 to pivot thereabout between a stowed position, as shown in FIG. 1, and a deployed position, as shown in FIG. 3. More specifically, as shown in FIG. 1, in the stowed position, the grab portion 44 of the handle 16 is position above the top surface 20 and aligned generally parallel with the longitudinal length of the trim panel 24. The handle 16, in the stowed position, may be used as a grab handle to support a passenger within the vehicle and to assist in the ingress and egress within the vehicle.

Figure 2:
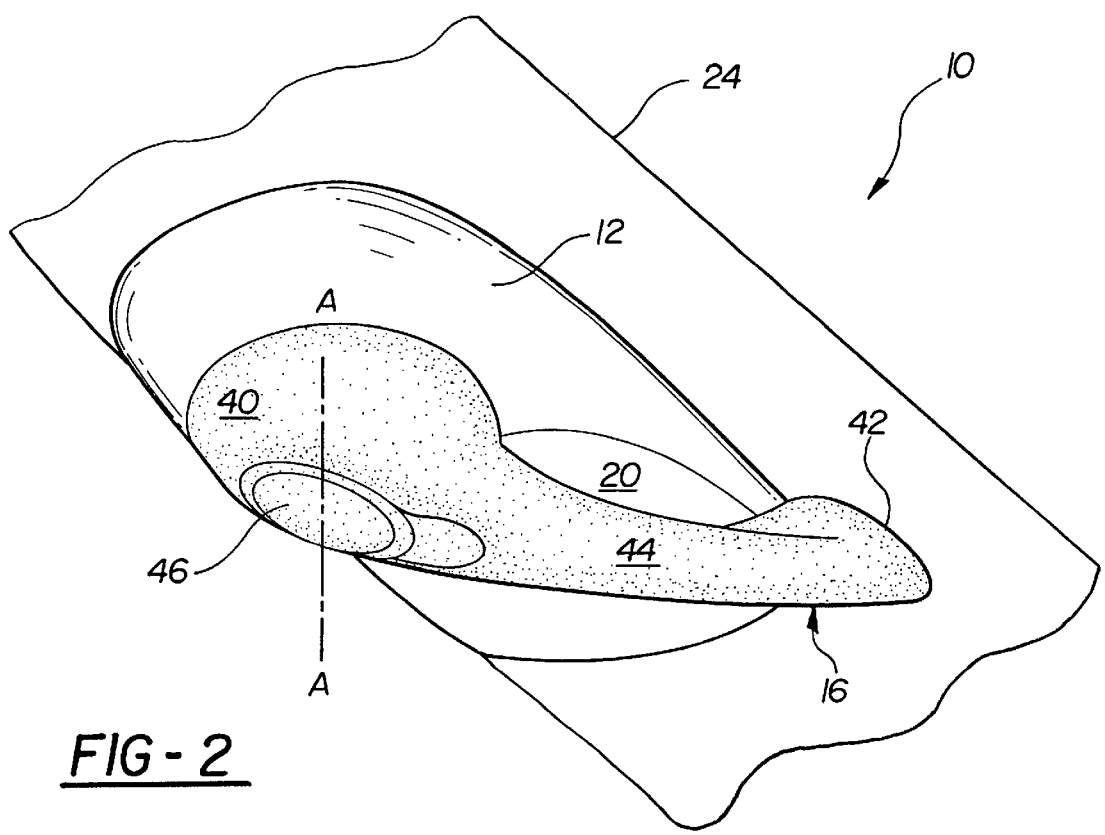
FIG. 2 is a perspective view of the combination grab handle and garment hook assembly partially pivoted toward a deployed position.

Referring to FIG. 2, the handle 16 is shown partially pivoted about the axis A—A in a counterclockwise direction between the stowed position and the deployed position. As shown, the handle 16 pivots along a plane which generally parallel to the plane of the trim panel 24. Referring now to FIG. 3, the handle 16 is shown pivoted to the fully deployed position, which is generally rotated 90 degrees about the pivot axis A—A, such that the handle 16 is position generally perpendicular to the longitudinal length of the base 12 and trim panel 24.

Figure 4:
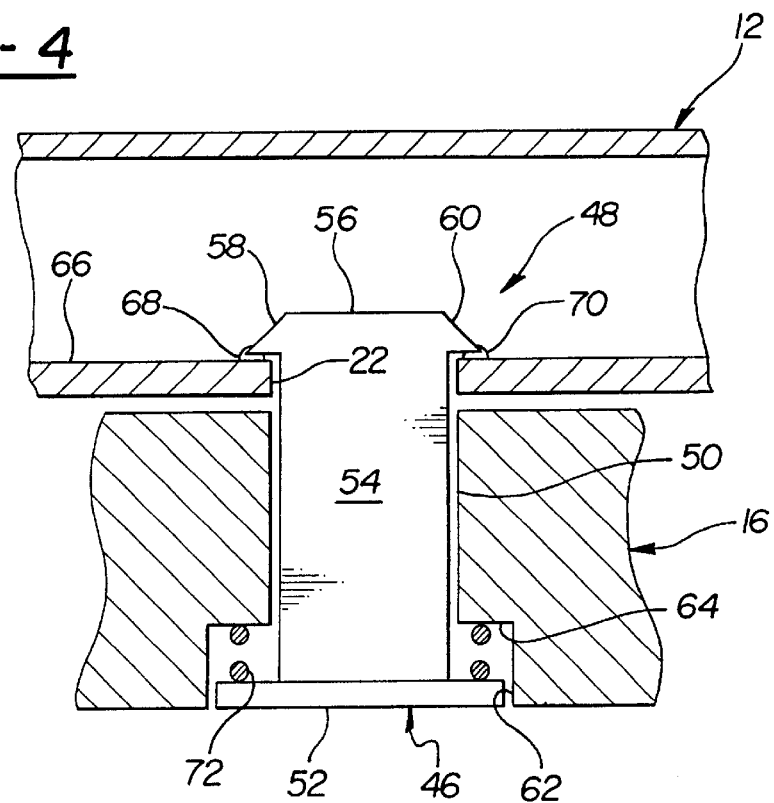
FIG. 4 is a cross-sectional view of a locking mechanism in a locked position.
Figure 5:
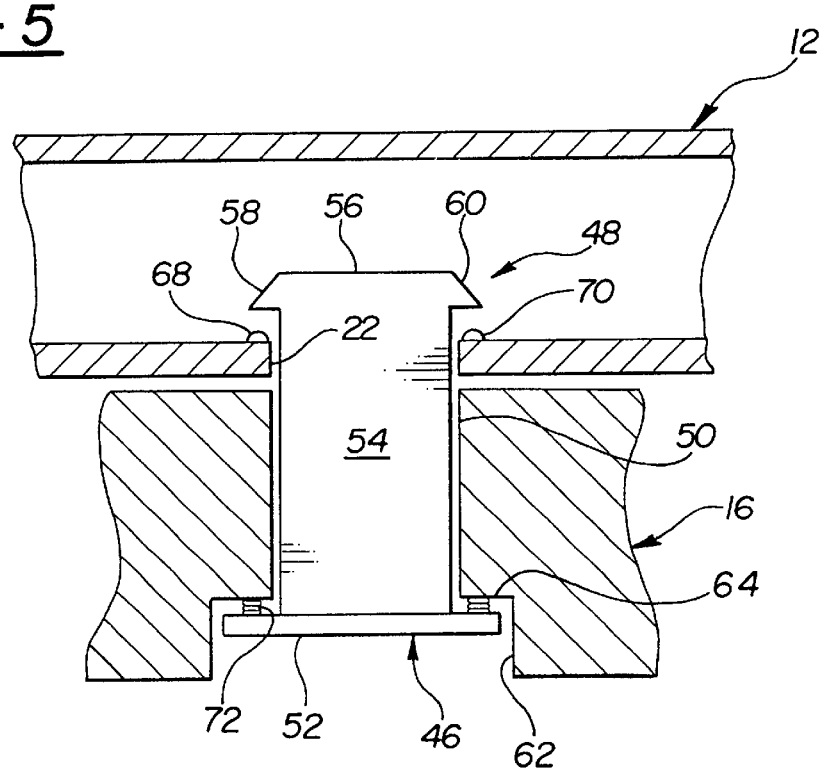
FIG. 5 is a cross-sectional view of the locking mechanism in an unlocked position.
Figure 6:
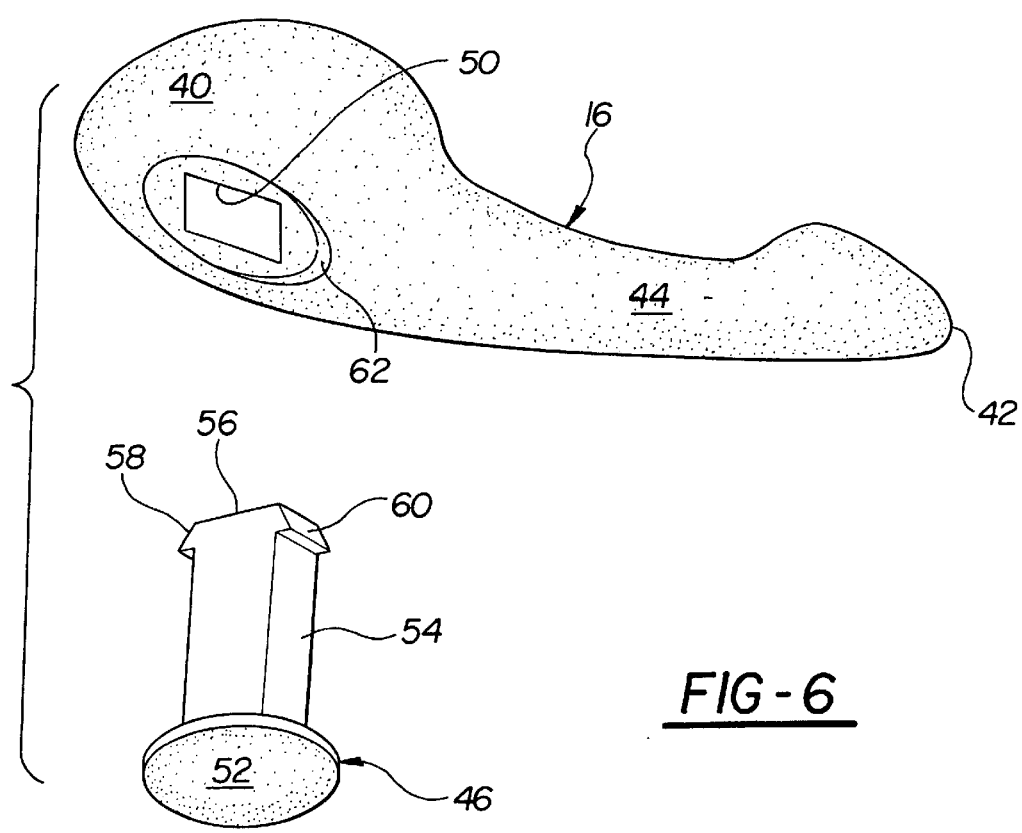
FIG. 6 is a partially exploded perspective view of the grab handle and pivot post.

Referring to FIGS. 4–6, the assembly 10 further includes a locking mechanism 48 for locking the handle 16 in each of the stowed and deployed positions. The locking mechanism 48 is defined by the interlocking relationship between the pivot post 46, handle 16 and base 12. Specifically, the mounting portion 40 of the handle 16 includes a generally rectangular bore 50 extending therethrough which is aligned axially with the opening 22 in the base 12. The pivot post 46 includes a cylindrical head portion 52 and a generally rectangular shaft 54 extending from the head portion 52 to a distal end 56. A pair of inclined barbs 58, 60 project outwardly from opposing sides of the shaft 54 adjacent the distal end 56. The mounting portion 40 of the handle 16 further includes a cylindrical recessed well 62 leading to the bore 50 for seating the head portion 52 of the pivot post 46. The diameter of the bore 50 is smaller than the diameter of the well 62 and a ledge 64 interconnects and extends therebetween. With the bore 50 aligned with the opening 22, the pivot post 46 is inserted through the bore 50 and opening 22 until the barbs 58, 60 extend past the wall 66 of the base 12. As shown in FIG. 4, the head portion 52 is seated in the well 62 and the barbs 58, 60 extend outwardly beyond the diameter of the opening 22 in the base 12 to prevent the pivot post 46 from being removed from the base 12. The interfit between the rectangular shaft 54 and the rectangular bore 50 forces the handle 16 to pivot with the pivot post 46 about the axis A—A.

The locking mechanism 48 further includes a plurality of detents 68, 70 projecting inwardly from the wall 66 of the base 12 adjacent the opening 22. The barbs 58, 60 engage with the detents 68, 70, respectively, as shown in FIG. 4, to prevent the pivot post 46 and handle 16 from pivoting or rotating. Additionally, a biasing member, such as a coil spring, 72 is positioned between the ledge 64 and the head 52 of the pivot post 46 to bias the post 46 out of the bore 50. The spring 72, therefore, also biases the barbs 58, 60 against the wall 66 of the base 12 around the perimeter of the opening 22 such that the barbs 58, 60 are retained against the detents 68, 70 in the stowed or deployed positions. That is, the detents 68, 70 are arranged around the perimeter of the opening 22 to define the position of the handle 16 in each of the stowed and deployed position, preferably 90 degrees apart.

In operation, referring to FIGS. 1–5, in the stowed positioned, the handle 16 may be used to support a passenger within the vehicle and to assist with the ingress and egress within the vehicle. The spring 72 biases the pivot post 46 outwardly, i.e. away from the base 12, forcing the barbs 58, 60 into engagement with the wall 66. The detents 68, 70, which are arranged around the circumference of the opening 22 in the wall 66 engage with the barbs 58, 60 to prevent rotational movement of the pivot post 46 in the stowed position. To pivot, or rotate, the handle 16 from the stowed position to the deployed position, the passenger depressed the head portion 52 of the pivot post 46 inwardly into the well 62 and against the biasing force of the spring 72 as shown in FIG. 5. The barbs 58, 60 on the distal end 56 of the post 46 are now spaced from the wall 66 and the detents 68, 70. The locking mechanism 48 is now in an unlocked condition and the passenger may pivot, or rotate, the handle 16 in a counterclockwise direction about the axis A—A relative to the base 12. The pivot post 46 rotates with the handle 16. Once the barbs 58, 60 are moved beyond the detents 68, 70, the head portion 52 of the pivot post 46 may be released. The handle 16 continues to be rotated to the deployed position, shown in FIG. 3, wherein the barbs 58, 60 engage detents positioned generally 90 degrees apart defining the stop for the deployed position. It should be appreciated that the one or both barbs 58, 60 may engage one or both detents 68, 70 in the stowed and deployed positions. Additionally, one of the barbs 58, 60 may engage one of the detents 68, 70 in the stowed position and the other one of the barbs 58, 60 may engage the other one of the detents 68, 70 in the deployed position. It should also be appreciated that other arrangements may be deployed for the barbs and detents to provide a positive engagement and stop in each of the stowed and deployed positions of the handle 16 without varying from the scope of the invention.

In the deployed position, shown in FIG. 5, the handle 16 may be used for supporting a relatively large capacity of garments and garment hangers on the grab portion 44 between the mounting portion 40 and the distal end 42. The bulbous shaped of the distal end 42 will prevent the garment hangers from sliding off of the handle 16. Additionally, with the handle 16 positioned generally perpendicular to the longitudinal length of the trim panel 24, the garments and garment hangers will hang from the handle 16 generally parallel to the interior door or window, thus preventing wrinkling and spoilage to the garments. Still further, the handle 16 remains available for use as a grab handle even in the deployed position absent the garments and garment hangers.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claim, the invention may be practiced otherwise than as specifically described.

What is claimed is:

1. A combination grab handle and garment hook assembly comprising:
   a base adapted to be mounted to an interior trim panel of a vehicle;
   an elongated handle;
   a pivot mechanism pivotally coupling said handle to said base for providing rotational movement of said handle relative to said base along a plane generally parallel to said base between a stowed position and a deployed position projecting into the interior of the vehicle;
   a locking mechanism for retaining said handle in each of said stowed and deployed positions; and
   said handle including a mounting portion coupled to said base by said pivot mechanism, a bulbous shaped distal end, and a grab portion extending longitudinally between said mounting portion and said distal end.

2. An assembly as set forth in claim 1 wherein said base includes a generally planar top surface spaced from said grab portion and said distal end of said handle.

3. An assembly as set forth in claim 2 wherein said base is generally elongated between a first and second end and wherein said mounting portion is pivotally coupled to said first end.

4. An assembly as set forth in claim 3 wherein the longitudinal length of said handle between said mounting portion and said distal end is aligned generally parallel with the longitudinal length of said base between said first and second ends in said stowed position.

5. An assembly as set forth in claim 4 wherein the longitudinal length of said handle between said mounting portion and said distal end is aligned generally perpendicular to the longitudinal length of said base between said first and second ends in said deployed position.

6. An assembly as set forth in claim 5 wherein said base includes a front wall having an opening therein and said mounting portion of said handle includes a bore extending therethough aligned axially with said opening.

7. An assembly as set forth in claim 6 wherein said pivot mechanism includes a pivot post having a head portion, a distal end and a shaft extending longitudinally between said head portion and said distal end.

8. An assembly as set forth in claim 7 wherein said pivot post extends axially through said bore in said handle and said opening in said base.

9. An assembly as set forth in claim 8 wherein said locking mechanism includes at least one barb projecting outwardly from said shaft adjacent said distal end of said pivot post.

10. An assembly as set forth in claim 9 wherein said mounting portion of said handle includes a recessed well adjacent said bore and defined by a planar ledge, said head portion of said pivot post being seated within said well and said barb extending through said opening in said wall of said base.

11. An assembly as set forth in claim 10 wherein said shaft is interlocked with said bore of said handle such that said pivot post rotates with said handle between said stowed and deployed positions.

12. An assembly as set forth in claim 11 wherein said locking mechanism includes at least one detent projecting from said base for engaging said barb to define and retain said handle in at least one of said stowed and deployed positions.

13. An assembly as set forth in claim 12 wherein said locking mechanism includes a biasing member seated in the well between said ledge of said handle and said head portion of said pivot post for biasing said barb into abutment with said wall of said base and said detent in at least one of said stowed and deployed position.

14. An assembly as set forth in claim 13 further including a track system for slidably coupling said base to the trim panel of the vehicle.

15. An assembly as set forth in claim 14 wherein said track system includes an anchor for supporting said base, said anchor having a mounting plate and a J-shaped hook portion adapted to be slidably coupled to the trim panel of the vehicle.

16. An assembly as set forth in claim 15 wherein said track system includes at least one bearing seated between said J-shaped hook portion and a portion of the trim panel for providing sliding movement of said base along the trim panel with the interior of the vehicle.

* * * * *

UNITED STATES PATENT AND TRADEMARK OFFICE
CERTIFICATE OF CORRECTION

PATENT NO. : 6,447,055 B1
DATED : September 10, 2002
INVENTOR(S) : Mainville et al.

It is certified that error appears in the above-identified patent and that said Letters Patent is hereby corrected as shown below:

Column 1,
Line 53, delete "Theses" and insert -- This -- therefor;

Column 2,
Line 62, delete "are" and insert -- is -- therefor;

Column 3,
Lines 18 and 31, delete "position" and insert -- positioned -- therefor;
Line 27, insert -- is -- after "which";

Column 4,
Line 11, delete "depressed" and insert -- depresses -- therefor;
Line 35, delete "the"; and
Line 49, delete "shaped" and insert -- shape -- therefor.

Signed and Sealed this

Fourth Day of February, 2003

JAMES E. ROGAN
*Director of the United States Patent and Trademark Office*